(12) United States Patent
Wang et al.

(10) Patent No.: US 11,620,421 B2
(45) Date of Patent: Apr. 4, 2023

(54) SYSTEM AND METHOD FOR IDENTIFYING DISTORTION-COMPENSATION THRESHOLD FOR SINTERING PARTS WITH COMPLEX FEATURES

(71) Applicant: GENERAL ELECTRIC COMPANY

(72) Inventors: Yongxiang Wang, Niskayuna, NY (US); Ananda Barua, Glenville, NY (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 17/162,219

(22) Filed: Jan. 29, 2021

(65) Prior Publication Data
US 2022/0245304 A1    Aug. 4, 2022

(51) Int. Cl.
*B33Y 50/02*       (2015.01)
*G06F 30/23*       (2020.01)
(Continued)

(52) U.S. Cl.
CPC ............ *G06F 30/23* (2020.01); *B29C 64/153* (2017.08); *B29C 64/386* (2017.08); *G06T 17/20* (2013.01);
(Continued)

(58) Field of Classification Search
CPC ................................ B33Y 50/00; B33Y 50/02
See application file for complete search history.

(56) References Cited

U.S. PATENT DOCUMENTS 9,815,118 B1    11/2017   Schmitt et al.
10,611,091 B2    4/2020   Sterenthal et al.
(Continued)

FOREIGN PATENT DOCUMENTS

CN    105588439 A    5/2016
JP    2017215957 A    12/2017
(Continued)

OTHER PUBLICATIONS

Extended European Search Report for application 21218002.0 dated Jun. 24, 2022 (11 pages).
(Continued)

*Primary Examiner* — Suresh Suryawanshi
(74) *Attorney, Agent, or Firm* — Dinsmore & Shohl LLP

(57) ABSTRACT

A system includes a memory module configured to store a computer model of a part for manufacturing with an additive manufacturing machine, and a processor communicatively coupled to the memory module. The processor is configured to receive the computer model, discretize the computer model into a mesh, predict a deformation behavior the plurality of nodes of the mesh under a simulated sintering process, determine a buckling factor for the part based on the predicted deformation behavior of the mesh, determine whether the buckling factor exceeds a threshold, in response to determining that the buckling factor exceeds the threshold, export the computer model to the additive manufacturing machine for pre-build processing, and in response to determining that the buckling factor does not exceeds the threshold, output, to a display of the system, at least one of an alert that the part is unstable or the buckling factor.

20 Claims, 11 Drawing Sheets

US 11,620,421 B2

Page 2

(51) Int. Cl.
  *B29C 64/153* (2017.01)
  *B29C 64/386* (2017.01)
  *G06T 17/20* (2006.01)
  *B33Y 10/00* (2015.01)
  *B33Y 50/00* (2015.01)
  *G06F 113/10* (2020.01)

(52) U.S. Cl.
  CPC .............. *B33Y 10/00* (2014.12); *B33Y 50/00* (2014.12); *G06F 2113/10* (2020.01)

(56) References Cited

U.S. PATENT DOCUMENTS

| | | | |
|---|---|---|---|
| 2019/0060997 | A1 | 2/2019 | Gibson et al. |
| 2020/0064812 | A1* | 2/2020 | Sims ..................... B29C 64/393 |
| 2021/0049244 | A1* | 2/2021 | Barua ................... B29C 64/386 |
| 2021/0283835 | A1* | 9/2021 | Novick ................. B29C 64/165 |
| 2022/0004678 | A1* | 1/2022 | Harris ..................... G06F 30/27 |
| 2022/0143694 | A1* | 5/2022 | Barua ................... B29C 64/386 |

FOREIGN PATENT DOCUMENTS

| | | |
|---|---|---|
| JP | 2018169799 A | 11/2018 |
| JP | 2019052856 A | 4/2019 |
| JP | 2019525849 A | 9/2019 |
| JP | 2019532837 A | 11/2019 |
| JP | 2020114677 A | 7/2020 |
| JP | 2021502273 A | 1/2021 |
| KR | 20110113344 A | 10/2011 |
| WO | 2018054502 A1 | 3/2018 |
| WO | 2020006237 A1 | 1/2020 |

OTHER PUBLICATIONS

Santos Luis S. et al: "Simulation of Buckling of Internal Features During Selective Laser Sintering of Metals", Additive Manufacturing, vol. 23, Aug. 7, 2018, pp. 235-245.
Marschall David et al: "Boundary Conformal Design of Laser Sintered Sandwich Cores and Simulation of Graded Lattice Cells Using a Forward Homogenization Approach", Materials & Design, Elsevier, Amsterdam, NL, vol. 190, Feb. 7, 2020, p. 5-p. 9.
Japanese Patent Office Action for Application No. 2022-010781 dated Oct. 31, 2022 (5 pages).

* cited by examiner

SYSTEM AND METHOD FOR IDENTIFYING DISTORTION-COMPENSATION THRESHOLD FOR SINTERING PARTS WITH COMPLEX FEATURES

BACKGROUND

Technical Field

The present specification generally relates to identifying the stability of a green part during high temperature sintering using finite element buckling analysis of the green part under sintering conditions.

Technical Background

Additive manufacturing (AM) processes are used to fabricate precision three-dimensional components from a digital model. Such components are fabricated using an additive process, where successive layers of material are consolidated, one on top of the other, on a build plate in an additive manufacturing machine (AMM). Certain additive processes may include sintering a part. As a result of the sintering process, the shape of the sintered part may become distorted. Conventional processes may potentially predict a distortion of the sintered part, but to do so, such processes must solve a complex, transient problem that takes a long time (e.g., hours or even days) to solve, making such processes unusable for quick iterative design approaches. Further, the conventional prediction processes use several assumptions about parameters that are hard to validate, making the output of conventional prediction processes less accurate.

SUMMARY

In an aspect, a system includes a memory module configured to store a computer model of a part for manufacturing with an additive manufacturing machine, and a processor communicatively coupled to the memory module. The processor is configured to receive, from the memory module, the computer model of the part, discretize the computer model of the part into a mesh including a plurality of nodes, predict a deformation behavior the plurality of nodes of the mesh under a simulated sintering process, determine a buckling factor for the part based on the predicted deformation behavior of the mesh, determine whether the buckling factor exceeds a threshold, in response to determining that the buckling factor exceeds the threshold, export the computer model to the additive manufacturing machine for pre-build processing, and in response to determining that the buckling factor does not exceeds the threshold, output, to a display of the system, at least one of an alert that the part is unstable or the buckling factor.

In some aspects, a method includes receiving, from a memory module, a computer model of a part; discretizing, with a computing device, the computer model of the part into a mesh including a plurality of nodes; predicting a deformation behavior the plurality of nodes of the mesh under a simulated sintering process; determining a buckling factor for the part based on the predicted deformation behavior of the mesh; determining whether the buckling factor exceeds a threshold; in response to determining that the buckling factor exceeds the threshold, exporting the computer model to an additive manufacturing machine for pre-build processing; and in response to determining that the buckling factor does not exceeds the threshold, outputting on a display at least one of an alert that the part is unstable or the buckling factor.

In some aspects, a non-transitory computer-readable medium storing instructions that, when executed by a computer processor, cause the computer processor to perform a method. The method includes receiving, from a memory module, a computer model of a part; discretizing, with a computing device, the computer model of the part into a mesh including a plurality of nodes; predicting a deformation behavior the plurality of nodes of the mesh under a simulated sintering process; determining a buckling factor for the part based on the predicted deformation behavior of the mesh; determining whether the buckling factor exceeds a threshold; in response to determining that the buckling factor exceeds the threshold, exporting the computer model to an additive manufacturing machine for pre-build processing; and in response to determining that the buckling factor does not exceeds the threshold, outputting on a display at least one of an alert that the part is unstable or the buckling factor.

Additional features and advantages of the manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments of the present disclosure provide systems and methods for predicting whether a component will be stable or not under extreme conditions such as sintering. More specifically the systems and methods identify buckling factors and buckling mode shapes (i.e., the first buckling mode shape) for a part under complex environments such as high temperature. For example, the systems and methods described herein may be used to predict whether a green part will experience a deformation such as a distortion or a buckling event as a result of a sintering process.

Figure 1A:
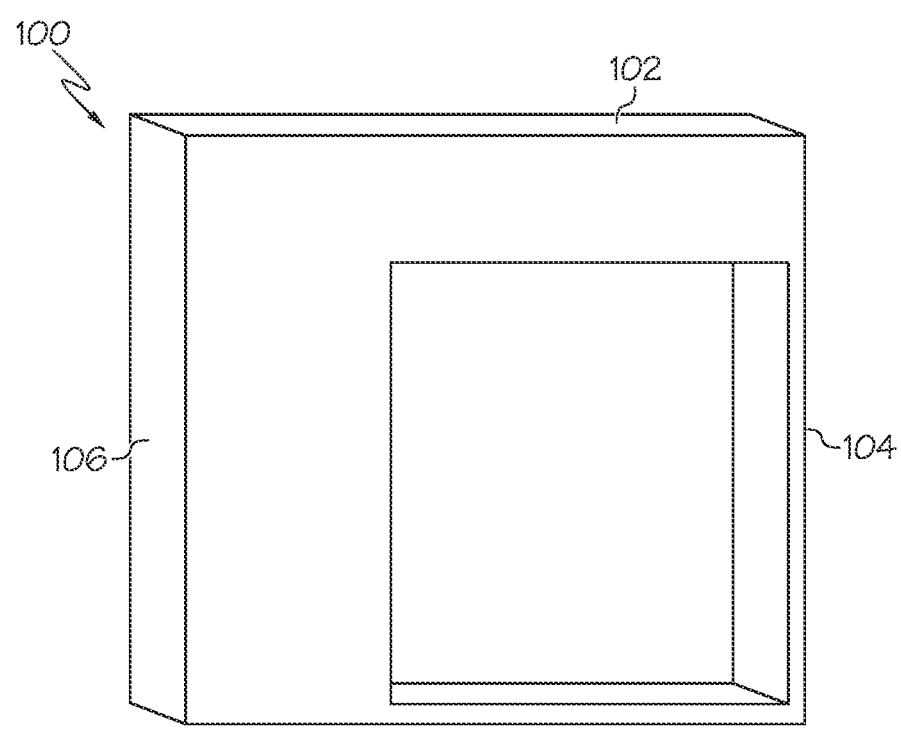
FIG. 1A depicts an illustrative green part prior to a sintering process.
Figure 1C:
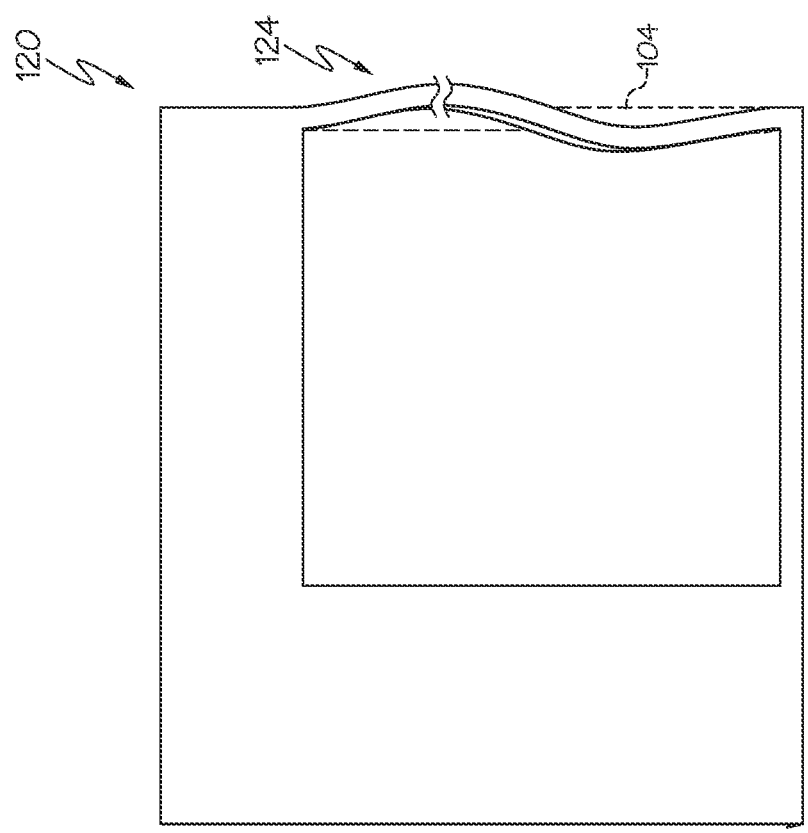
FIG. 1C depicts an illustrative part after sintering the green part illustrated in FIG. 1A, illustrating a buckling event of the green part as a result of a sintering process.
Figure 1B:
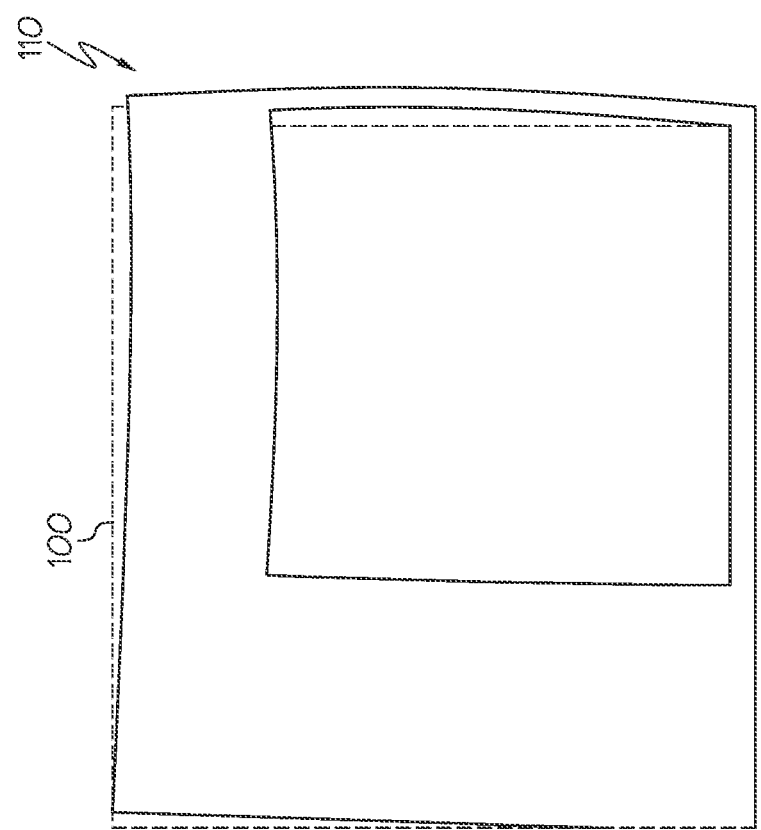
FIG. 1B depicts an illustrative part after sintering the green part illustrated in FIG. 1A, illustrating a distortion event of the green part as a result of a sintering process.

As used herein "deformation" refers generally to a change in the shape of a part, which includes at least two sub classes, "distortion" which is stable deformation and "buckling event" which is unstable deformation. FIGS. 1A-1C describe the difference between distortions and buckling events, however, generally, buckling events refer to the loss of structural integrity of a component (e.g., a green part) while distortions generally refer to events of a less degree of deformation.

As used herein, a "green part" refers to a component such as a one that is manufactured using an AM process such as a binder jet printer. Binder jet printers refer to a variety of AM machines and process. For example, a binder jet printer may include a system that prints or jets binder onto a powder bed where the binder binds build material (e.g., metal particles or other material) which it contacts on the powder bed into a green part. The green part has a low mechanical strength until it is sintered, whereby sintering melts and/or permanently fuses the build material together to form the final dense component. It should be understood that the terms "part" and "component" may be used interchangeably herein.

Additionally, as used herein, "buckling factor" refers to a load multiplier of the load applied to a component indicating the critical load of the component. Critical load refers to the load at which a structural member of the component suddenly changes shape, buckles. A component may experience more than one buckling event, however, the first buckling event is referred to as the first buckling mode shape.

The buckling mode shape presents the shape that the component assumes when it buckles. This does not indicate numerical values of displacement or stress. Numerical values that are provided are relative values. As discussed herein, the buckling mode shapes and buckling factors are determined through eigenvalue buckling analysis (e.g., see EQ. 1, below).

$$(K_0^{NM} + \lambda_i K_\Delta^{NM})v_i^M = 0, \qquad \text{EQ. 1}$$

where $K_0^{NM}$ is the stiffness matrix corresponding to the base state, which includes the effects of preloads, $P^N$, if any; $K_\Delta^{NM}$ is the differential initial stress and load stiffness matrix due to the incremental loading pattern, $Q^N$; $\lambda_i$ are the eigenvalues; and $v_i^M$ are the buckling mode shapes (eigenvectors).

Systems and methods analyze a computer model of the component (e.g., a green part). The computer model parameterizes the material, composition, structure, behavior, and the like so that a computing device may perform a finite element analysis or a similar process on the parameterized geometry of the component (e.g., a green part) under sintering conditions to identify buckling factors and buckling modes of the green part. When a component (e.g., a green part) is sintered, varying degrees of deformation may occur. Some deformations may present as shrinkage, warping, thinning, or the like. However, in some instances, deformations may be extreme and amount to a buckling event of one or more structural members of the component. Buckling is referred to herein as relating to a part losing structural integrity and experiencing a sudden change in shape.

As briefly discussed above, an example of an AM process is binder jet printing. In binder jet printing, a binder is selectively deposited onto a powder bed of material on the build plate, bonding these areas together to form a solid part one layer at a time. The material may be, for example, a polymer, a metal, a ceramic, or the like. The binder jet printing joins the grains/particles of material of the powder bed together via the binder to create a binder-printed part. This binder-printed part may be referred to as a "green part". The green part may then be received in a sintering furnace.

When a green part is exposed to a high temperature (e.g., ~1000° C.), binder within the green part which holds the particles of the green part together is evaporated, expelled, decomposed, burned-off, or otherwise removed from the green part. The temperature may be raised to sinter the particles such that the powder material particles are solidified together to form a sintered and solid part. Accordingly, under sintering conditions, the green part may become malleable, thereby permitting the weight of the part to deform less stable portions of the green part before the effects of sintering are fully realized. This deformation may be a result of the thermally-induced processes of sintering. For example, the sintering process may include densification of the initially porous part leading to volumetric shrinkage. The deformation may also be a result of gravity induced warping of the part.

As a non-exhaustive example, the green part may include 50% to 70% by volume of the particulate material used to form the layers of powder material. Another 1% to 2% of the volume of the green part may include cured binder solution (e.g., cured from the binder solution introduced to give portions of the layers of powder material structure, for example, during binder jet additive manufacturing processes). A remainder of the volume of the green part may be porous, for example, void volume defining a porosity. As such, after production by the additive manufacturing apparatus, the green part may generally be approximately 50% dense to 70% dense. It should be understood that such densities may be after performance of post-printing processes (e.g., transferring, inspection, depowdering, and the like) of the green part.

To further densify the green part, the green part is transferred to a sintering furnace (not depicted) that heats the green part to at least a first elevated temperature. In embodiments, sintering of the green part may occur in multiple stages. For example, in embodiments, sintering may include heating the green part to at least a first elevated temperature to induce thermal decomposition of at least a portion of a binder used to print the green part (e.g., to "debind" the green part). The green part may then be heated above a second elevated temperature that is greater than the first elevated temperature to consolidate powder particles to form a post-sintering part. The second elevated temperature may be referred to as a sintering compaction temperature at which to the particulate material used to form the layers of powder material begins to melt in order to solidify the green part and compact the green part into a post-sintering part. In embodiments, the second elevated temperature is greater than or equal to 300° C. (e.g., greater than or equal to 500° C., greater than or equal to 700° C., greater than or equal to 1000° C.). In embodiments, the post-sintering part possesses a higher density than the green part. For example, the post-sintering part may comprise 95% or more by volume of sintered particulate material with about 5% or less being a porous volume.

The systems and methods disclosed herein provide analysis tools to a user (e.g., a designer or engineer) that allow the user to analyze a green part under sintering conditions so that less stable (e.g., weak) features may be identified and improved during the design phase rather than expending time and resources performing iterative trials to determine the best design to achieve the desired sintered part. As will be described in more detail herein, the systems and methods generally include performing a distortion analysis of a green part under sintering conditions, determining a buckling factor for the green part using an eigenvalue buckling analysis based on the results of the distortion analysis such that the lowest load at which the green part becomes unstable is determined, and comparing the buckling factor against a calibrated buckling threshold to determine whether the part (or portions of the geometry) will likely buckle or not during sintering. If the green part (e.g., the structure) is determined to be stable, for example, wherein the buckling factor is greater than a calibrated buckling threshold, the computer model of the green part undergo pre-build processing and then sent for manufacturing using an AMM. The pre-build processing may include a pre-build compensation process that adjusts the computer model to account for any predicted distortions (e.g., deformations that do not result in a buckling event).

Various embodiments of the systems and methods for determining the stability of a part during high temperature sintering using finite element buckling analysis of the part under sintering conditions are shown and described herein. Turning now to the drawings, wherein like numbers refer to like structures, and particularly to FIGS. 1A-1C. FIG. 1A depicts a green part 100 prior to a sintering process. FIG. 1B depicts a deformed sintered part 110. FIG. 1C depicts a buckling mode shape 120 of a green part 100 following a process such as sintering. The green part 100 includes structural members such as a top portion 102 supported by a first vertical portion 104 and a second vertical portion 106 that are separate by a void volume. The first vertical portion 104 is thinner and has less structural volume than the second vertical portion 106. When the green part 100 undergoes a sintering process, depending on the structural integrity of the green part and sintering conditions, the green part may experience distortions and/or buckling events. For purposes of the present application, distortion refers to shape changes to a component while maintaining its structural integrity. On the other hand, a buckling event refers to the loss of structural integrity (e.g., when the buckling factor for the component is less than a predetermined threshold) of a structural member of a component which may be sudden and/or catastrophic to the structure of the component under load. In general, loads during sintering are loads due to gravity. However, it should be understood that the present application may be used to analyze other loads than just those due to gravity during a sintering process.

FIG. 1B depicts a distortion of the green part 100 as the result of a sintering process, that is a deformed sintered part 110. On the other hand, FIG. 1C depicts a buckling mode shape 120 of a component 100 as the result of a sintering process. As in FIG. 1B, an overall distortion of the component 100 is shown. Importantly, the deformed sintered part 110 did not lose structural integrity, but rather the deformed sintered part was able to hold together under load, including its own weight and extreme temperatures from sintering.

Figure 7A:
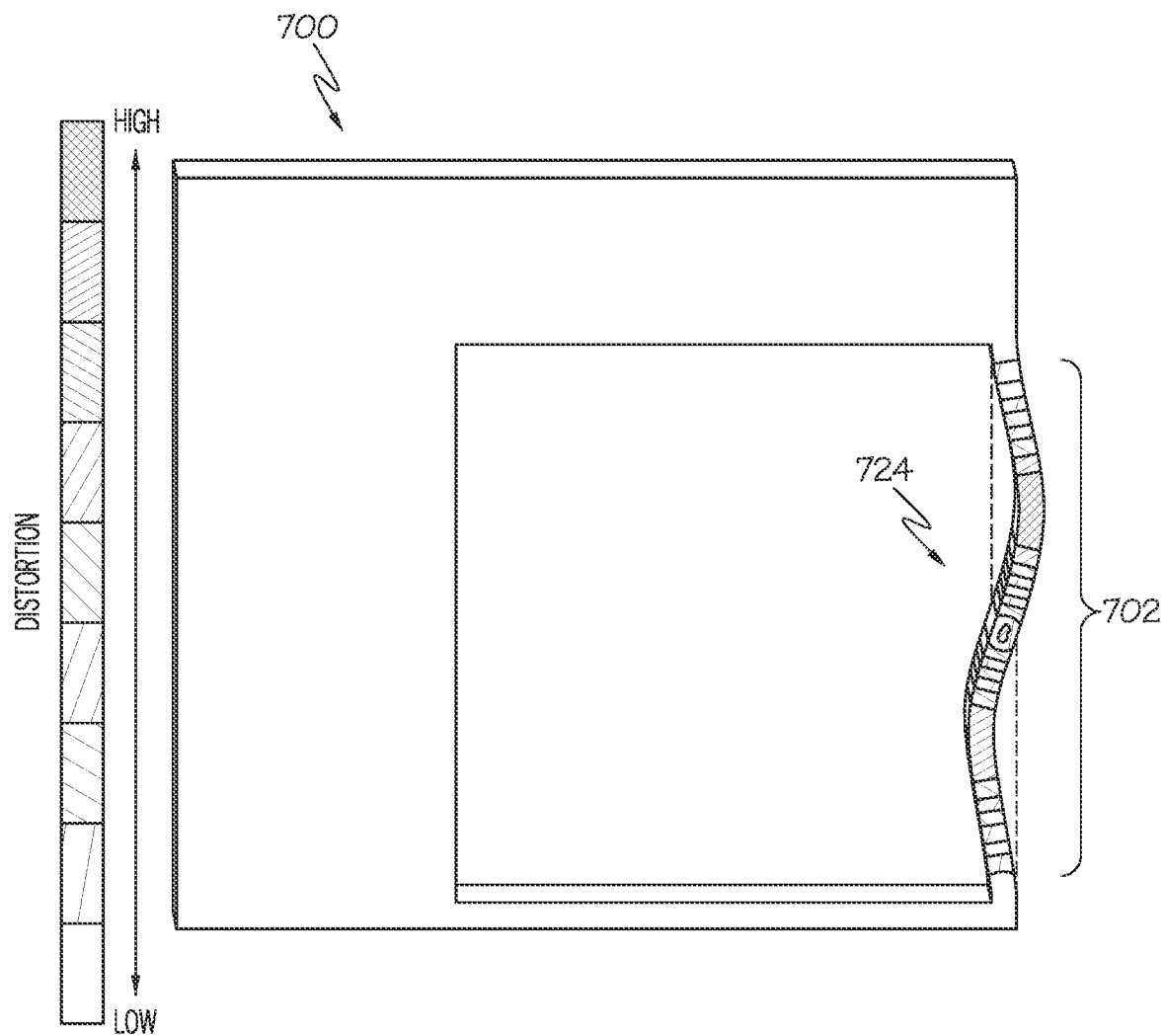
FIG. 7A depicts an illustrative buckling analysis result having a heat map illustrating the buckling mode shape of portions of the part based on the sintering conditions, according to one or more embodiments shown and described herein.

FIG. 1C on the other hand has suffered a buckling event 124 within the first vertical portion 104 of the component 100. Here, the first vertical portion 104 is unable to maintain structural integrity under load, including its own weight (e.g., the weight of the top portion 102 and/or the weight of itself, the first vertical portion 104 due to gravity) and extreme temperatures from sintering. The buckling event 124 may result in the failure of structural integrity a structural member of a component which in some cases may include the collapse, fracture, and/or breaking apart of one or more structural members. It should be understood that distortions may be corrected by reorienting the component or adjusting the sintering parameters. However, in general, buckling events require a redesign that may include stiffening the component along sections that are vulnerable to buckling events. The systems and methods descried herein are directed to determining the buckling factor for a component under extreme conditions such as sintering and predicting buckling mode shapes, such as those depicted in FIGS. 1C and 7A. While not always desirable because sintering parameters are defined so that a components internal structure densifies, sintering parameters may also be adjusted to address buckling events.

In addition to embodiments that predict buckling mode shapes and determine a buckling factor for a component, embodiments may provide for a distortion and correction module to calculate part distortion during sintering. It should be understood that distortions, as referred to herein, refer to changes in a component shape during loading and sintering, but do not arise to a buckling event where the component loses structural integrity, for example, in a sudden and/or catastrophic manner. In one or more embodiments, the distortion and correction module may virtually pre-distort parts prior to printing such that the part sinters to the required shape after the sintering process is complete.

Figure 2A:
FIG. 2A depicts an illustrative green part in the form of a rod prior to sintering.
Figure 2B:
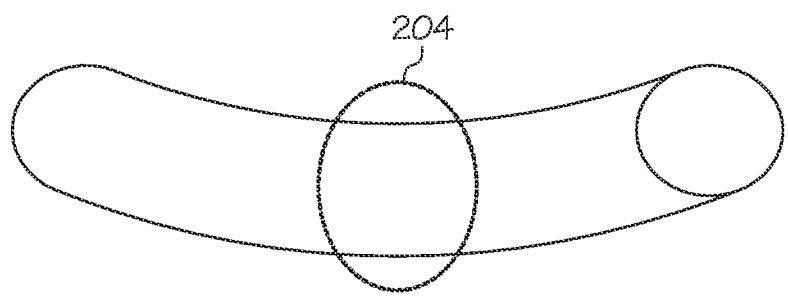
FIG. 2B depicts a deformation of the rod of FIG. 2A after sintering when no compensation for the deformation of the rod during sintering was implemented.
Figure 2C:
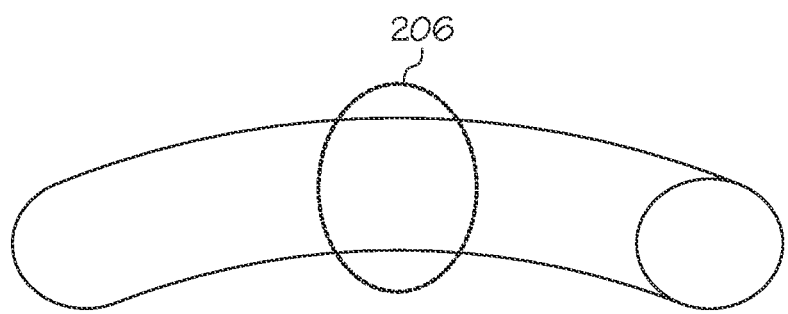
FIG. 2C depicts an illustrative compensated green part configured to anticipate the deformation as a result of sintering according to one or more embodiment shown and described herein.

As another non-exhaustive example of a distortion, so that the difference between distortion and buckling may be better understood, FIGS. 2A-2C illustrate a gravity-induced distortion of a round rod 202 and measures that may be taken to counteract the distortion. As depicted the round rod 202 may be supported during sintering by supports 210 at each end. As the round rod 202 is heated (e.g., sintered), a middle portion 204 (FIG. 2B) may sag because the round rod 202 as a green part is unable to support its own mass under the force of gravity as the binder is removed during heating. The round rod 202 deform, for example, into a "U" shape as depicted in FIG. 2B. As mentioned above, some embodiments may provide for a distortion and correction module to calculate part distortion during sintering. The distortion and correction module may predict the distorted shape in FIG. 2B, and then calculate a correction (e.g., the middle portion 206 of round rod 202) as shown in FIG. 2C to form an "n" shape (e.g., upside-down "U"). The correction may a design change to the green part (e.g., straight bar 202) such that an amount of distortion resulting from sintering a straight round rod 200 as depicted in FIG. 2A is calculated or measured from experimental trials. As such, the correction may include designing the part such that distortion is still allowed to occur, but as it deforms the part would deform into the desired final form, for example a straight round rod 200 as depicted in FIG. 2A. In other words, pre-distorting (e.g., changing the original geometry) the green part prior to sintering may result in the sintered part matching (or substantially matching) the green part shown in FIG. 2A. It is noted that in one or more embodiments, the pre-distortion may not be exactly the opposite displacement as the predicted distortion, as the distortion and correction module may optimize the number of iterations until an acceptable pre-distortion is calculated. Continuing with the bar example, from the round rod 202 in FIG. 2A to the "U" shape in FIG. 2B, the center of the bar has been displaced one inch. However, if the center of the green part (e.g., the middle portion 206 of round rod 202) is pre-distorted an inch in the opposite direction, it may not result in a sintered part matching the green part because an arch (e.g., curve of the shape) may not distort in the same way the linear round rod does. As such, an "n" shape with a 1-inch arch may not move down by one inch to form the linear round rod, and instead, the distortion prediction and correction nodule may determine that an "n" shape with a half-inch arch may be distorted by the sintering process to form the linear round rod, matching the bar 202 depicted in FIG. 2A.

Figure 3A:
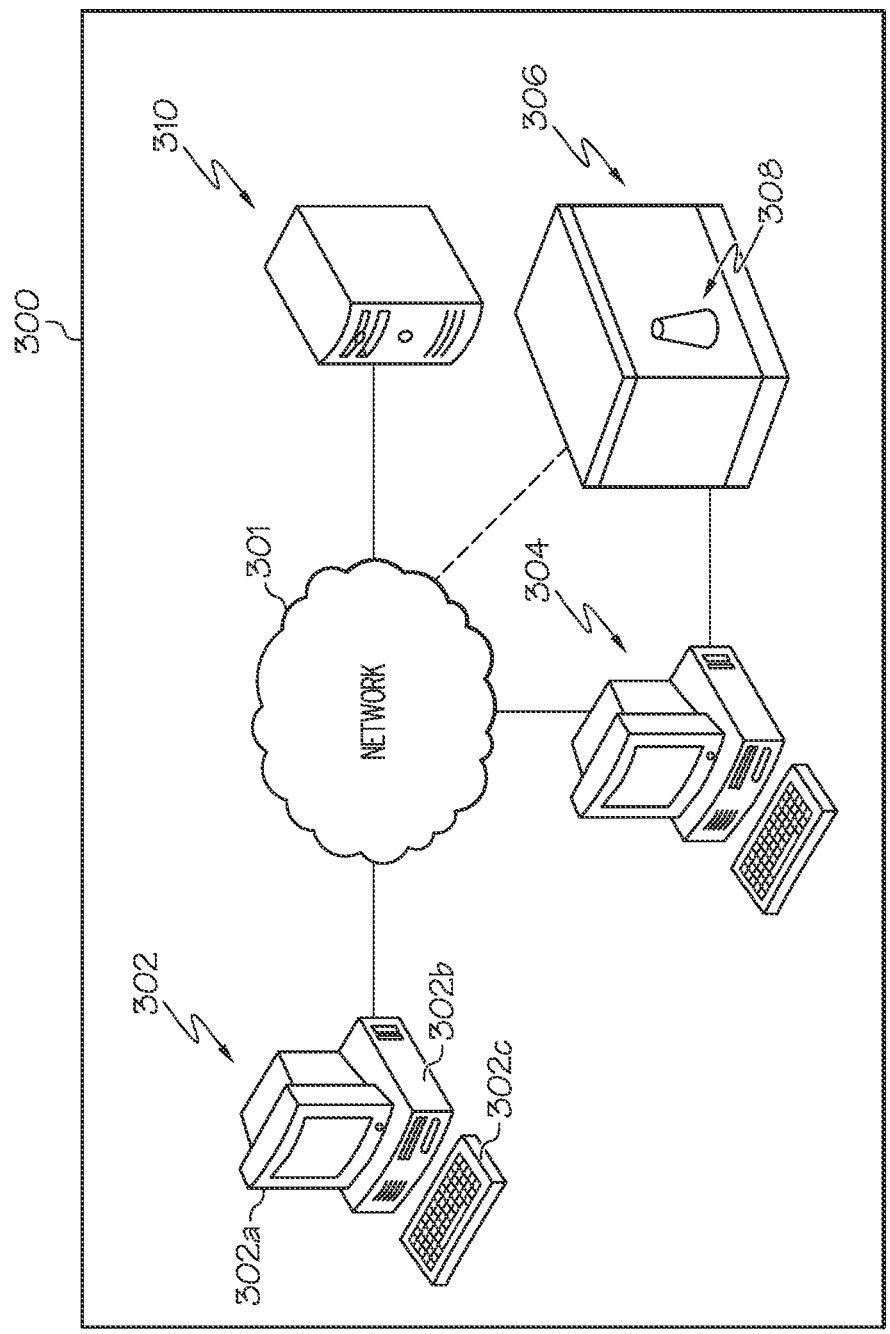
FIG. 3A schematically depicts an illustrative system for predicting whether a green part will lose geometrical stability (e.g., buckle) when sintered, according to one or more embodiments shown and described herein.

Turning to FIGS. 3A-8, embodiments of the systems and methods for predicting buckling mode shapes of a component under sintering conditions and determining a buckling factor for the component to determine whether compensations to the sintering process or position/orientation of the component during sintering are possible and if not, indicate that modifications to the design are needed before manufacturing are provided. Referring now to FIGS. 3A and 3B, illustrative system 300 and computing device 304 for predicting buckling mode shapes of a part under sintering conditions and determining a buckling factor for the part to determine whether modifications to the design are needed before manufacturing is depicted. The system 300 may be deployed over a network 301. The network 301 may include a wide area network, such as the internet, a local area network (LAN), a mobile communications network, a public service telephone network (PSTN) and/or other network.

The network 301 may be configured to electronically and/or communicatively connect a user computing device 302, a computing device 304, one or more data servers 305, and an additive manufacturing machine (AMM) 306.

The user computing device 302 may include a display 302a, a processing unit 302b and an input device 302c, each of which may be communicatively coupled together and/or to the network 301. The user computing device 302 may be a server, a personal computer, a laptop, a tablet, a smartphone, a handheld device, or the like. The user computing device 302 may be used by a user of the system to provide information to the system. For example, the user may be upload a computer model of a part for manufacture, input or update parameters for the deformation prediction analysis and/or buckling analysis, and/or receive alerts, buckling mode shapes or the like from the computing device 304. The user computing device 302 may utilize a local application or a web application to access the computing device 304 and/or the AMM 306. The computing device 304 may host and provide an interactive interface to the user computing device 302 such that a user may query, select, and/or input information that may be relayed to the computing device 304 and/or the AMM 306. The system may also include one or more data servers 310 having one or more databases from which information may be queried, extracted, updated, and/or utilized by the computing device 304 and/or the AMM 306.

Additionally, the system includes a computing device 304. The computing device 304 may be a server, a personal computer, a laptop, a tablet, a smartphone, an application specification handheld device, or the like. The computing device 304 may include a display and an input device each of which may be communicatively coupled together. The computing device 304, which is described in more detail herein, may be configured to host applications and execute processes related to the system described herein. It should be understood that while a user computing device 302 and one or more data servers 310 are depicted in the illustrative system of FIG. 3A, each of the functions and operations performed by the user computing device 302 and one or more data servers 310 may be embodied and configured by the computing device 304.

It is also understood that while the user computing device 302 and the computing device 304 are depicted as personal computers and the one or more data servers 310 is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 3A as a single piece of hardware, this is also an example. More specifically, each of the user computing device 302, the one or more data servers 310, and the computing device 304 may represent a plurality of computers, servers, databases, and the like. For example, each of the user computing device 302, the one or more data servers 310, and the computing device 304 may form a distributed or grid-computing framework for implementing the methods described herein.

The AMM 306 may be any rapid-prototyping, rapid manufacturing device, or additive manufacturing device such as a binder jet additive manufacturing, fused deposition modeling (FDM), stereolithography (SLA), digital light processing (DLP), selective laser sintering (SLS), selective laser melting (SLM), laminated object manufacturing (LOM), electron beam melting (EBM), and/or the like. The AMM 306 may include a processor and memory and other electronic components for receiving a computer model 600 (FIG. 6) of a part 308 for printing. The computer model 600 may be converted to a design configuration file corresponding to the part 308 for additive manufacturing and may be uploaded to the AMM 306, for example, by the computing device 304.

Figure 3B:
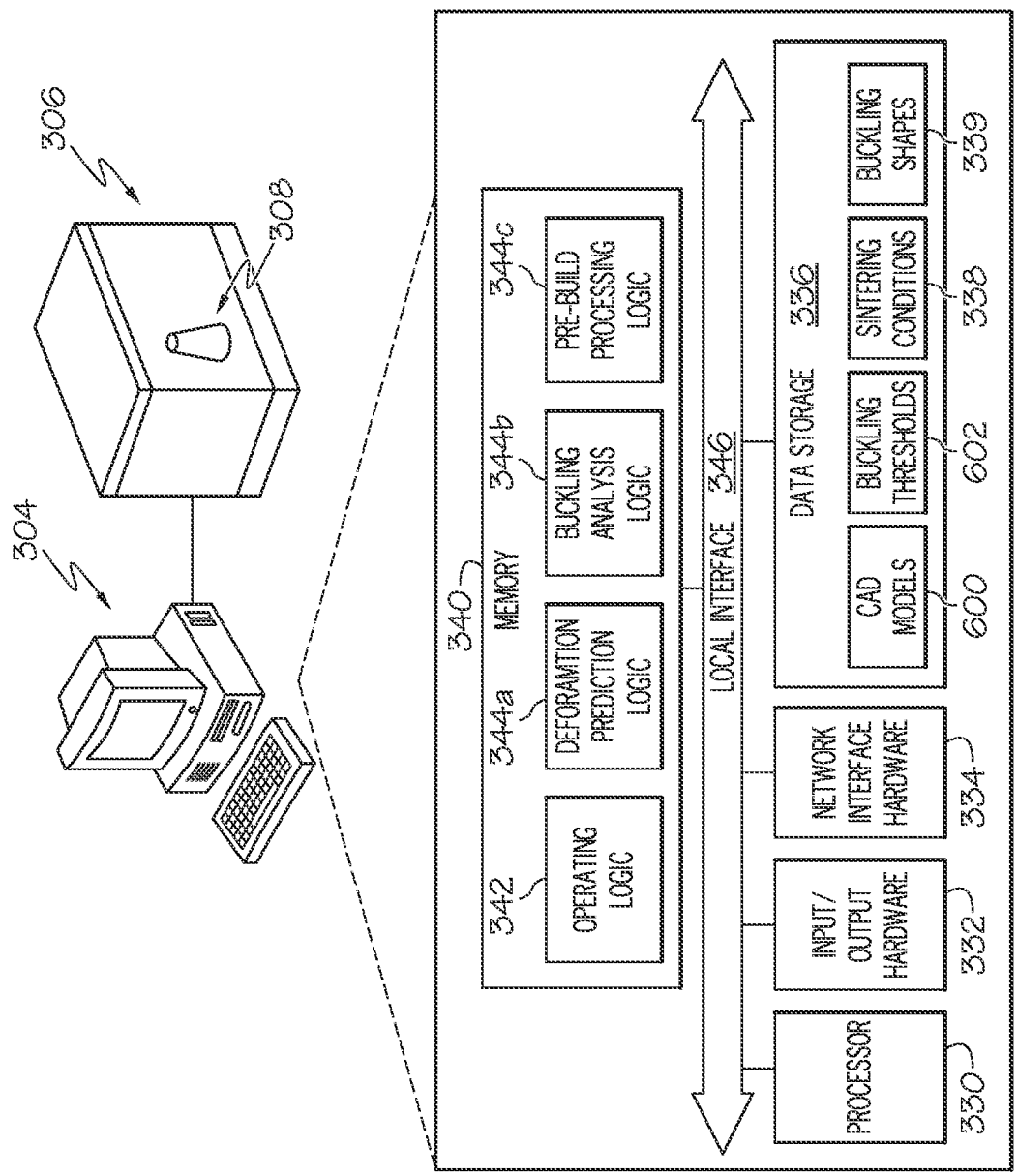
FIG. 3B schematically depicts an illustrative computing device for predicting whether a green part will buckle when sintered, according to one or more embodiments shown and described herein.

In some embodiments, the system 300 may be implemented through the interconnectivity of multiple devices as depicted in FIG. 3A. In other embodiments, the system is implemented through a computing device 304 communicatively coupled to the AMM 306. Regardless of the implementation of the system, FIG. 3B depicts an illustrative computing device 304. The computing device 304 may utilize hardware, software, and/or firmware, according to embodiments shown and described herein. While in some embodiments, the computing device 304 may be configured as a general-purpose computer with the requisite hardware, software, and/or firmware, in some embodiments, the computing device 304 may be configured as a special purpose computer designed specifically for performing the functionality described herein.

As illustrated in FIG. 3B, the computing device 304 includes a processor 330, input/output hardware 332, network interface hardware 334, a data storage component 336, and a memory module 340. The memory module 340 may be machine readable memory (which may also be referred to as a non-transitory processor readable memory). The memory module 340 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 340 may be configured to store operating logic 342, a deformation prediction logic 344a (e.g., logic enabling block 412 of method 400 depicted in FIG. 4), a buckling analysis logic 344b (e.g., logic enabling blocks 414 and 416 of method 400 depicted in FIG. 4), and pre-build processing logic 344c (e.g., logic enabling block 420 of method 400 depicted in FIG. 4) (each of which may be embodied as a computer program, firmware, or hardware, as an example). A local interface 346 is also included in FIG. 3B and may be implemented as a bus or other interface to facilitate communication among the components of the computing device 304.

The processor 330 may include any processing component(s) configured to receive and execute programming instructions (such as from the data storage component 336 and/or the memory module 340). The instructions may be in the form of a machine readable instruction set stored in the data storage component 336 and/or the memory module 340. The input/output hardware 332 may include a monitor, keyboard, mouse, printer, camera, microphone, speaker, and/or other device for receiving, sending, and/or presenting data. The network interface hardware 334 may include any wired or wireless networking hardware, such as a modem, LAN port, Wi-Fi card, WiMax card, mobile communications hardware, and/or other hardware for communicating with other networks and/or devices.

It should be understood that the data storage component 336 may reside local to and/or remote from the computing device 304 and may be configured to store one or more pieces of data for access by the computing device 304 and/or other components. As illustrated in FIG. 3B, the data storage component 336 may stores computer models 600 (e.g., CAD models) of the part 308 for manufacture, the mesh 602, the buckling thresholds 338a, sintering conditions 338b, and/or buckling mode shapes 338c. As described herein the computer models 600 may be of CAD models the part to be manufactured. The CAD models may define attributes of the green part of the part for additive manufacturing, such as a defined geometry, material, design tolerances, powder sizes distribution, binder type and amounts per layer, sintering profile, expansion factors, and the like. The mesh 602 is a discretized representation of the computer model 600 having a plurality of nodes 604 and elements 601.

The buckling thresholds 338a include sets of calibrated thresholds for various materials, powder sizes, and process conditions. A set of buckling threshold values may be selected for use by identifying the set that is most closely related to the materials, powder sizes, and process conditions for the part to be analyzed. Calibrated buckling thresholds 338a based on coupon testing (e.g., coupons 501-508) reduces the number of iterative and experimental tests that are needed on actual components to determine whether a computer model 600, more specifically, the part represented therein, will be stable during the sintering process and not buckle. The sintering conditions 338b are also stored in the data storage component 336. Sintering conditions include but are not limited to the temperature profile and time associated with the one or more temperatures defined in the temperature profile. For example, a sintering conditions for sintering a particular green part may include heat at 1000° C. for 3 hours. This is merely an example.

The data storage component 336 also includes the buckling mode shapes 338c that are generated to graphically illustrate the predicted buckling mode shape of the green part under sintering conditions. The buckling mode shape 338c may be illustrated in a variety of ways.

Figure 4:
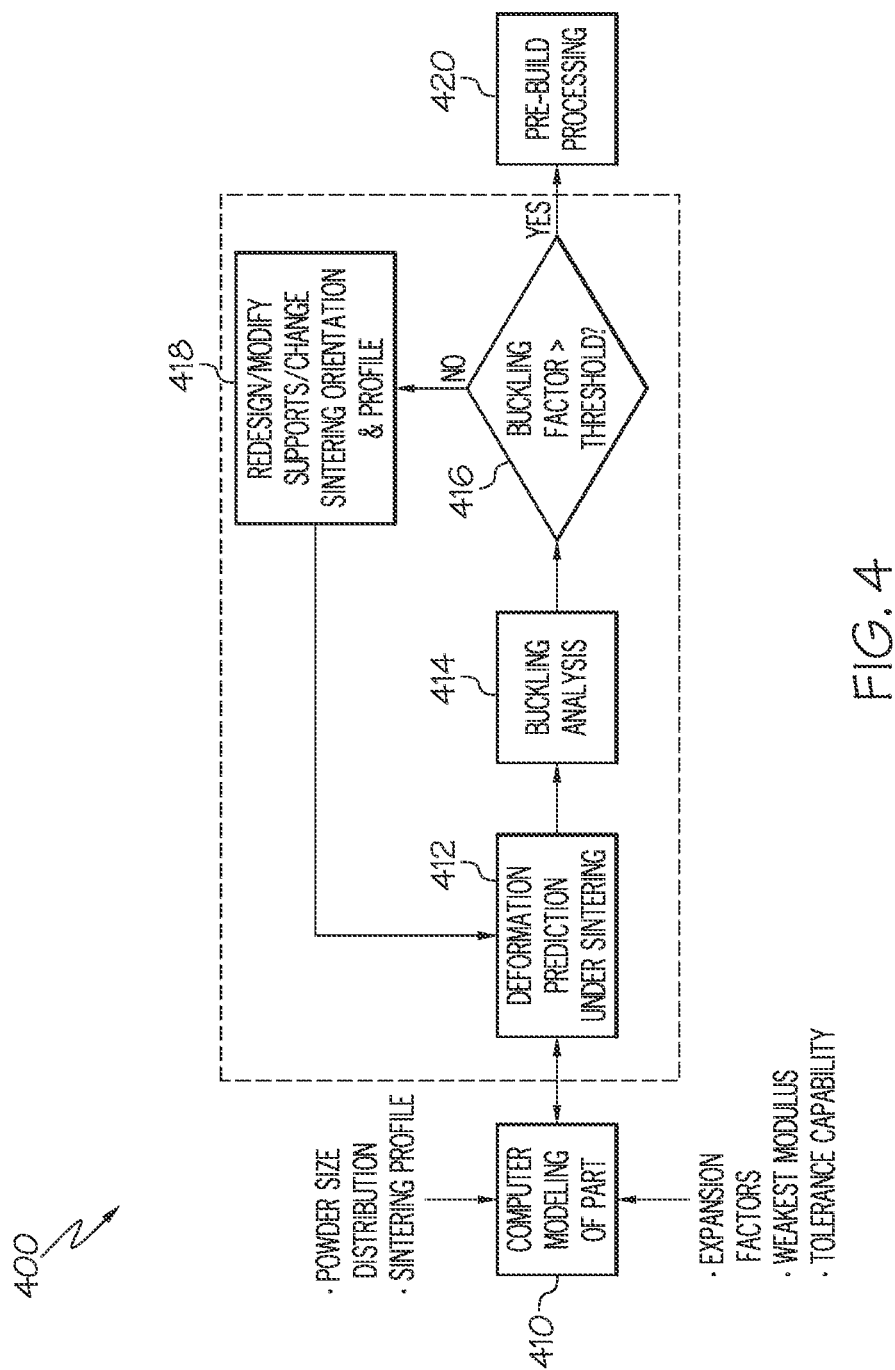
FIG. 4 depicts a flow diagram of an illustrative method for predicting whether a green part will buckle when sintered, according to one or more embodiments shown and described herein.

Referring now to FIG. 4, a flow diagram of an illustrative method 400 according to embodiments described herein is depicted. Method 400 and other methods described herein may be performed using any suitable combination of hardware (e.g., circuit(s)), software or manual processes, as described herein. In one or more embodiments, the system 300 (FIGS. 3A and 3B) is configured to perform the method 400. The system 300 may be a special-purpose electronic device configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these methods will be described below with respect to embodiments of the system, but embodiments are not limited thereto.

Referring to FIGS. 4 and 6A-6C, at block 410, a computer model 600 of a part for manufacturing via an AMM is generated. Computer modeling of the part may include parameters that define the powder size and distribution (e.g., for binder jet AM), a sintering profile (e.g., temperature profiles and durations), material properties such as expansion factors, moduli, tolerance capability, and/or the like. In one or more embodiments, the computer model of the part may include at least one of a defined geometry for one or more parts, a material used to manufacture the part(s), one or more design tolerances associated with the part, powder size distribution, a sintering profile (e.g., specification of time and temperature and environment at which the part will be sintered), expansion factors (e.g., geometric scaling factors in X, Y, Z spatial dimensions, to correct the part for shrinkage during sintering), an effective elastic modulus of the material undergoing the sintering process and other relevant material properties such as Poisson's ratio and density, and tolerance capability of the AM process. The defined geometry for the part may be in the form of a CAD model or any other suitable model (referred to herein as the computer model). The computer model of the part generated at block 410 may be input to a processing unit (e.g., the processor 330 of a computing device 304, FIGS. 3A and 3B) for deformation and buckling analysis.

Figure 6A:
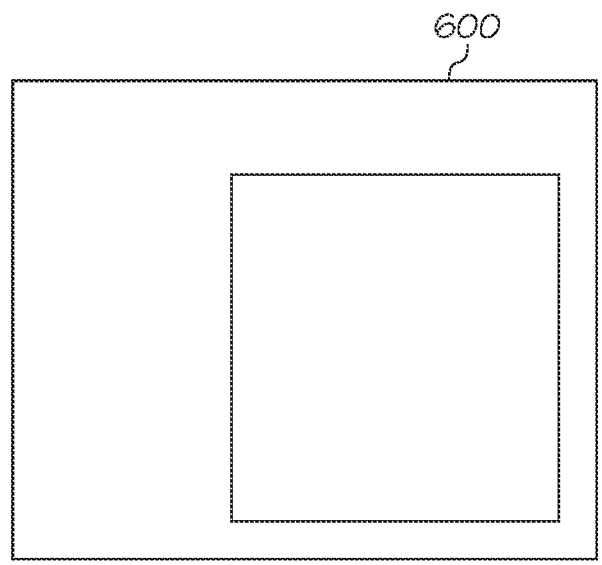
FIG. 6A depicts an illustrative computer model of a part, according to one or more embodiments shown and described herein.
Figure 6B:
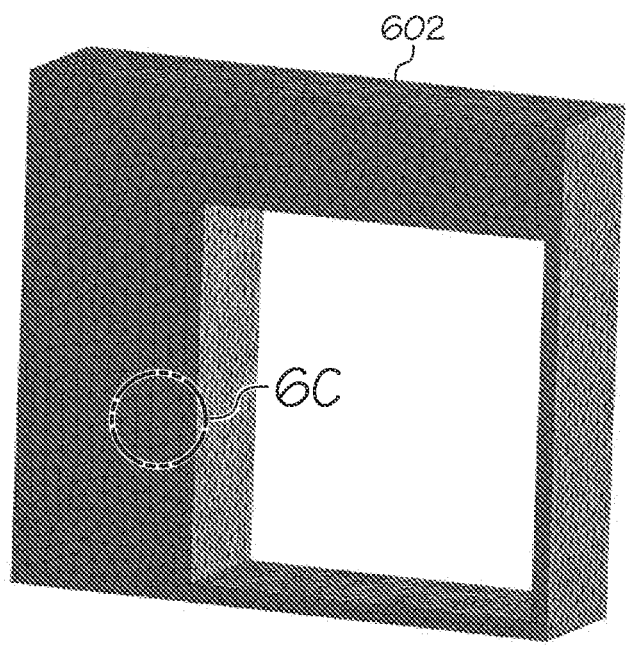
FIG. 6B depicts an illustrative mesh of the computer model of the part depicted in FIG. 6A, according to one or more embodiments shown and described herein.
Figure 6C:
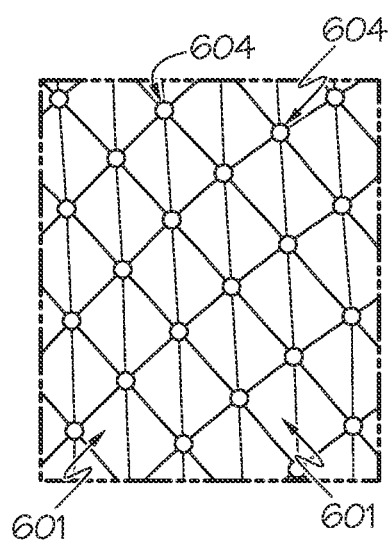
FIG. 6C depicts a magnified portion of the illustrative mesh depicted in FIG. 6B, according to one or more embodiments shown and described herein.

At block 412, a processing unit, such as the processor 330 of the computing device 304 as depicted in FIG. 3B, receives, from a memory module 340, the computer model 600 of the part. The processor 330 discretizes the computer model 600 of the part into a mesh 602 including a plurality of nodes 604 and uses the discretized computer model such as the mesh 602 to predict a deformation behavior the plurality of nodes 604 of the mesh 602 under sintering conditions. FIG. 6C depicts a magnified portion of the mesh 602 depicted in FIG. 6B for purposes of better illustration and description of the mesh 602. The "elements" 601, shown in FIG. 6C, are discrete solids, which are populated to make up the full solid geometry. An element 601 is the smallest discrete region of the solid for purpose of the analysis. An element 601 may be represented by a tetrahedron (4 sided), parallelepiped (6 sided), or the like. Typically, nodes 604 represent the corners and/or mid-sides of elements. Any suitable meshing process may be used to discretize the defined computer model 600 into the mesh 602. Each node 604 has a tolerance associated therewith with respect to the distance the node may be displaced from its original position in the mesh 602. The tolerance may be provided by a designer of the CAD model, or any other suitable user. The tolerance may also be specified for a subset of the nodes.

Still referring to block 412 of FIG. 4, the processor 330 may implement a finite element analysis of the part geometry, defined by the computer model 600, under the appropriate boundary and loading conditions and using the material properties provided as inputs. The loading condition for the analysis may include gravity as one of the external forces. The boundary condition may include displacement constraints relative to the surface on which the part is placed during sintering. This analysis may be a linear or non-linear analysis and it may be used to calculate the displacement of each node of the model.

In embodiments, the processor 330 at block 412 predicts a deformation behavior of the part under sintering conditions. At block 414, the processor 330 determines a buckling factor for the part based on the predicted deformation behavior of the mesh. The buckling factor may be determined using an eigenvalue buckling analysis using the results of the finite element analysis generated at block 412. The eigenvalue buckling analysis calculates the lowest load at which the part becomes unstable. This lowest load is referred to as the buckling factor. The analysis also provides a corresponding buckling mode shape which indicates which portion of the geometry will likely buckle. In general, the buckling analysis performed at block 414 calculates buckling factors that quantify the ability of a part to sustain external loads such as gravity under high temperature without undergoing unacceptable deformations. The buckling mode shape, which is described in more detail herein, may be depicted in various forms, including but not limited to, a heat map of the part, a computer model of the part post sintering, an animation illustrating the predicted deformation behavior including any buckling behavior or the like. The buckling mode shape assists a user in identifying where to add supports.

Once the buckling factor for a component is determined, at block 416, the processor 330 determines whether the buckling factor for the component exceeds a threshold. The decision is made by comparing the lowest buckling factor (BF) against a pre-determined range of threshold values. For example, the threshold range can be defined in three segments: unstable: BF<0.8; potentially unstable (user discretion): 0.8<BF<1.1; and stable: BF>1.1 Stable. In some embodiments, when the BF indicates that the component may be unstable, a redesign of the component may be required. The redesign may include improving weak features as indicated by the buckling mode shape, updating the sintering process and/or the like. Other activities may also be implemented such as adjusting the orientation of the component for sintering so that loads are distributed through the component through different structural members thereby reducing undesired loads on weak features. When the BF indicates that the component is stable, pre-building processing including distortion compensation as discussed with respect to FIGS. 2A-2C may be implemented. An acceptable threshold for a component may be selected from those indicating stable or potentially unstable ranges, when compensation or other mitigating measures are implemented. These ranges are merely an example, others threshold values may be implemented depending on the design and/or margin of safety for a part. Moreover, the exact values for the threshold can be determined by coupon experiments using the relevant powder and process conditions. For example, referring briefly to FIG. 5.

Figure 5:
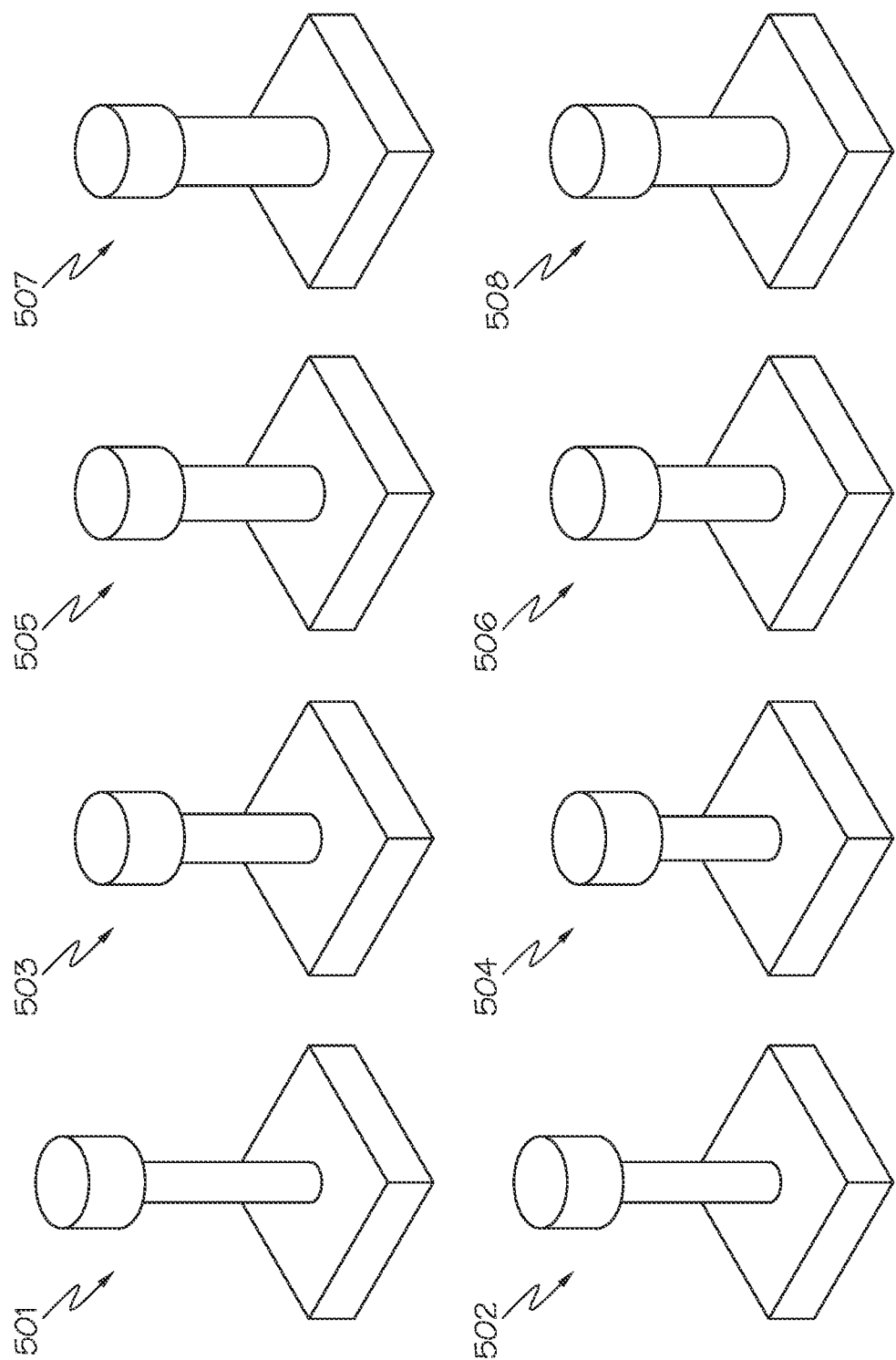
FIG. 5 depicts illustrative examples of coupons for calibrating a buckling threshold of a green part, according to one or more embodiments shown and described herein.

FIG. 5 illustrates a plurality of coupons 501-508 having different combinations of column lengths and diameters to cover a range of buckling factors. The coupon designs (e.g. computer models of the coupons) are analyzed using the deformation prediction (e.g., block 412, FIG. 4) and the buckling analysis (FIG. 414, FIG. 4) to determine a first mode buckling factor. The coupons are then sintered and observed for signs of buckling or not. Table 1 below depicts the design parameters of the coupons 501-508 and their resulting buckling behaviors observed post sintering.

TABLE 1

| Coupon | Column Diameter (inch) | Column Length (inch) | $1^{st}$ Mode Buckling Factor | Experiment |
| --- | --- | --- | --- | --- |
| 401 | 0.2 | 1.0 | 0.573 | Buckled |
| 402 | 0.2 | 0.9 | 0.696 | Buckled |
| 403 | 0.2 | 0.8 | 0.859 | Mild buckling |
| 404 | 0.2 | 0.7 | 1.082 | Mild buckling |
| 405 | 0.25 | 0.8 | 1.897 | No buckle |
| 406 | 0.25 | 0.7 | 2.406 | No buckle |
| 407 | 0.3 | 0.8 | 3.523 | No buckle |
| 408 | 0.3 | 0.7 | 4.498 | No buckle |

Based on the experimental results, threshold values for unstable, potentially stable, and stable structures may be defined and applied to related parts having the same or similar design parameters (e.g., material, powder size, sintering profile, binder material, etc.). An unstable part would have a BF<0.859, a potentially stable part's BF would be between 0.859 and 1.897, and a stable part's BF would be 1.897 or greater, based on the illustrative example.

Referring back to FIG. 4, the processor 330 determines whether the buckling factor for the part exceeds the threshold (e.g., the stable threshold or at least the unstable threshold) at block 416. If the buckling factor is determined to exceed the threshold at block 416, then the computer model 600 may be approved for pre-build processing at block 420. However, if the buckling factor is determined to not exceed the threshold at block 416, then an output including an alert that the part is unstable and/or the buckling factor for the part is carried out at block 418. At block 418, a display of the buckling mode shape of the part may be generated. The buckling mode shape may illustrate one or more portions of the computer model 600 that are predicated to deform based on the predicted deformation behavior. Furthermore, suggestions as to where the part should be strengthened may be presented. In some embodiments, the buckling mode shape includes a heat map illustration (e.g., FIG. 7A) of the part identifying the shape that the part assumes when it buckles. In some embodiments, system may generate a buckling mode shape at different time intervals throughout the simulated sintering process to illustrate distortion and or buckling events as they occur in response to different amounts of time the green part is exposed to the sintering temperatures. (e.g., FIG. 7B). Once design modifications are made, for example, based on the suggestions as to where the part should be strengthened, the method 400 may return to block 412 for further deformation analysis. Buckling mode shapes will be described in more detail herein below.

Referring back FIG. 4 at block 420, when the buckling factor is determined to exceed the threshold, the computer model 600 may undergo pre-build processing. Pre-build processing may include implementing a deformation compensation adjustment to the computer model to account for non-buckling deformations that were predicted at block 412. In some embodiments, a nodal position adjustment process may use a calibration model to determine an adjusted pre-distorted position for each node. The adjustment of the nodal positions may be based on the predicted non-buckling deformations at block 412. In some embodiments, with the adjustment, the original coordinates of the nodes may be modified so as to be opposite to the direction that they are predicted to deform. Note that not all of the nodes in the original mesh 602 may be adjusted. As a non-exhaustive example, if a node is predicted to deform +5 mm in the current iteration, the adjustment may be to move the node back to −c*5 mm, where "c" is a scaling factor that can be set for each node The scaling factor may be a scalar number and it determines the extent to which the node is moved during the adjustment process. This scalar number may be defined separately for each node. It can also be set by the user as an input to the correction module. As described above with the bar example, from the bar 202 in FIG. 2A to the "U"-shape in FIG. 2B, the middle portion 204 of the bar has been displaced one inch. However, if the center of the green part is pre-distorted (e.g., adjusted) an inch in the opposite direction, it may not result in a sintered part matching the green part because an arch (e.g., curve of the shape) may not distort in the same way the linear bar does. As such, an "n" shape with a 1-inch arch may not move down by one inch to form the linear bar. Via several iterations of the process described herein, the processor 330 may determine that an "n" shape with a half-inch arch may be distorted by the sintering process to form the linear bar, matching the green part in FIG. 2A. In one or more embodiments, the processing unit may use the scaling factor to determine the adjustment. As described above, everywhere in the part may not distort in the same way, so different nodal points may be adjusted in different ways, per the scaling factor, to arrive at a part within tolerance.

The functional blocks and/or flow diagram elements described herein may be translated into machine-readable instructions or as a computer program product, which when executed by a computing device, causes the computing device to carry out the functions of the blocks. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

As described above, the processor 330 may generate a buckling mode shape 120 as shown in FIG. 1C. In some embodiments, for example, referring to FIG. 7A, the buckling mode shape 700 (from FIG. 1C) may include a heat map 702 that depicts the degree of buckling (or deformation) across portions of the green part during sintering. As depicted, the first vertical portion 724 of the component has buckled into a reverse "S" shape. The heat map 702 provides a designer with a way to identify structural members of the component that are weak and may require redesign or additional support to increase the buckling factor to make the part more stable. In some embodiments, the buckling mode shape 700 may be an illustration of a first, second, third, or other buckling mode shape of the component once the sintering process is complete. For example, the buckling mode shape 700 depicts a predicted shape of the sintered component after a simulated sintering process which resulted in a reverse "S" buckled shape of the first vertical portion 724 of the component.

Figure 7B:
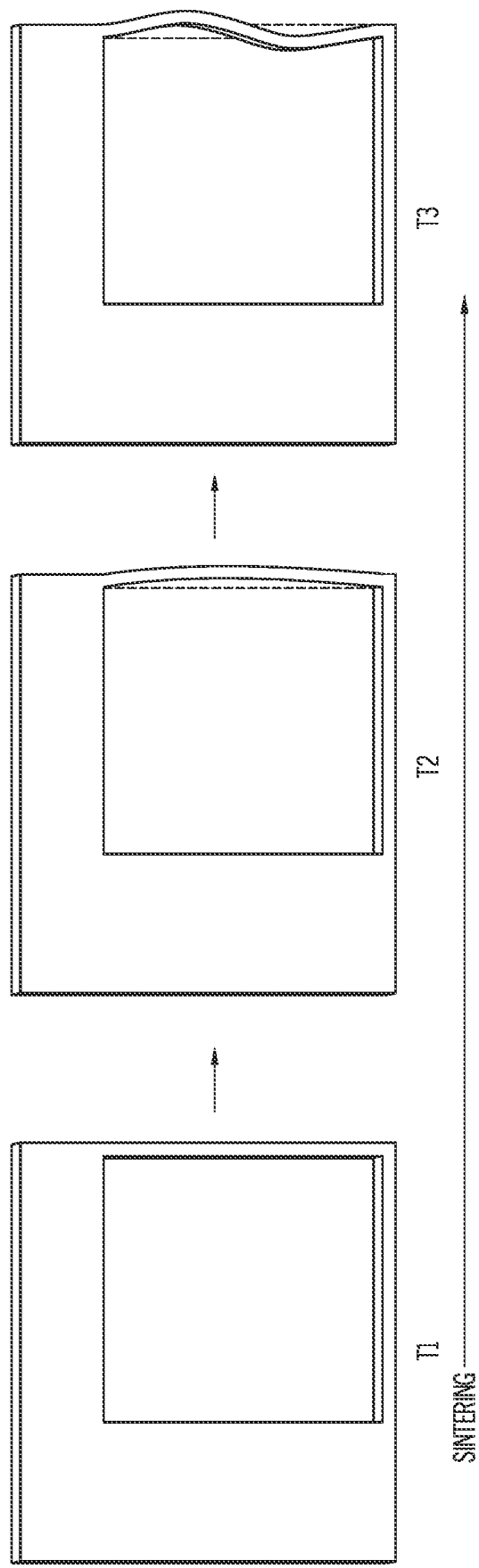
FIG. 7B depicts an illustrative mode shape of a modelled part at different time intervals during the simulated sintering process, according to one or more embodiments shown and described herein.

In some embodiments, the buckling mode shape may be calculated at different time intervals during the simulated sintering process. For example, FIG. 7B depicts three instances of component at different time points during the simulated sintering process. Since the sintering process is defined at least by a time period and a sintering temperature, it may be advantageous to determine the buckling mode factor and the buckling mode shape after first and successive intervals of time and/or first and successive sintering temperatures. For example, referring to FIG. 7B, the computing device may calculate and display a buckling mode analysis for intervals of the sintering process. In some embodiments, each buckling mode shape may include a heat map indicating the amount of relative deformation on various structural members of the component if it buckles as a result of the sintering process through the time interval in which the buckling analysis was calculated. For example, the BF for the component resulting from the sintering process through the first interval, T1, may be calculated and indicate that the component is stable. Then, after a second time interval, T2, a deformation may be determined. In such a case the BF for the component resulting from the sintering process through the second interval, T2, may be calculated and indicate that the component is possibly unstable. However, after a third time interval, T3, a buckling mode shape is predicted. The BF for the component resulting from the sintering process through the third interval, T3, may be calculated and indicate that the component is unstable. In should be understood that the buckling event may occur rapidly after a deformation occurs. In response to the buckling analysis, as discussed above, the computing device and/or user may determine whether and how to implement corrective actions to address the predicted buckling mode shape.

Figure 8:
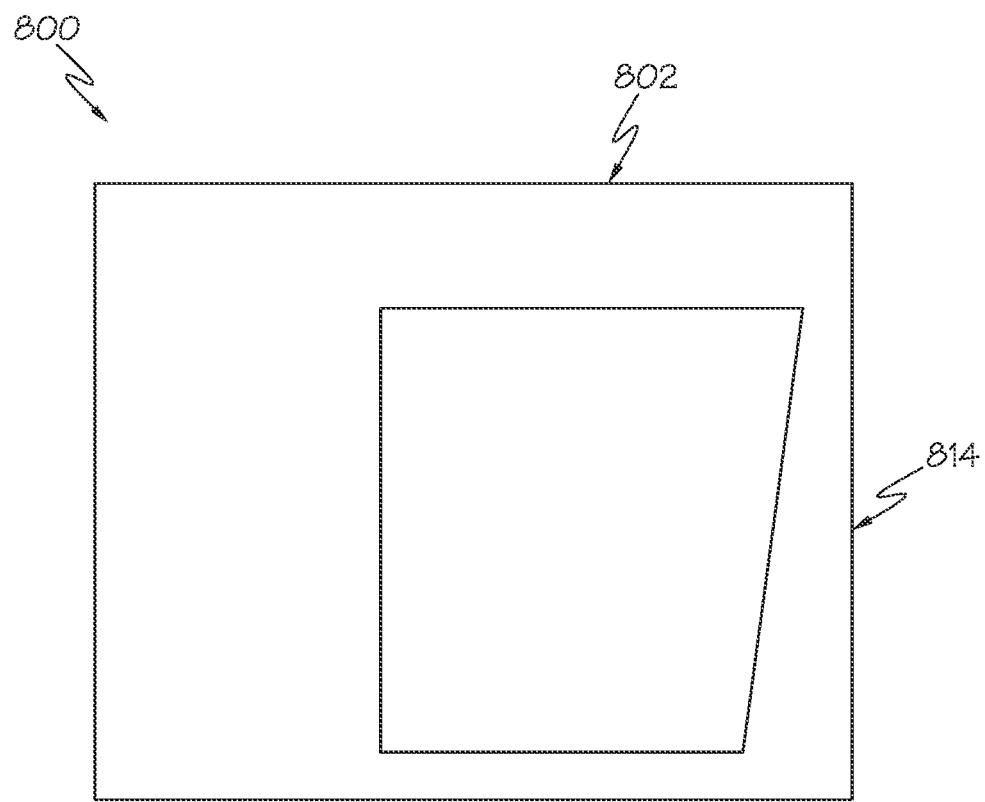
FIG. 8 depicts an illustrative example of a redesigned green part for sintering that is designed to be stable under sintering conditions, according to one or more embodiments shown and described herein.

Referring now to FIG. 8, an illustrative example where the computer model 600 (FIG. 6A) of the component 100 is redesigned as the illustrated redesigned component 800. The redesigned component 800 is more stable (e.g., has a higher BF than the component depicted in FIG. 6A) during the sintering process. As shown, the first vertical portion 814 of the redesigned component 800 now includes a profile that increases in thickness from top to bottom in order to improve the structural stability of itself and the top portion 802. The redesign of the first vertical portion 814 improves the stability of the redesigned component 800 during sintering thereby reducing deformation and eliminating a buckling event.

It should now be understood that systems and methods described herein enable a user such as a designer or engineer to test, redesign, and validate parts for additive manufacturing and sintering in an efficient and low-cost manner. That is, the systems and methods described herein provide analysis, simulation, and design tools to a user that would otherwise need to be carried out through iterative design, manufacturing, sintering, and manual analysis. For example, a system may include a memory module configured to store a computer model of a part for manufacturing with an additive manufacturing machine and a processor communicatively coupled to the memory module. The processor is configured to receive, from the memory module, the computer model of the part, discretize the computer model of the part into a mesh including a plurality of nodes, predict a deformation behavior the plurality of nodes of the mesh under sintering conditions, determine a buckling factor for the part based on the predicted deformation behavior of the mesh, and determine whether the buckling factor exceeds a threshold. When the buckling factor exceeds the threshold, the processor exports the computer model for pre-build processing. When the buckling factor does not exceed the threshold, the processor outputs at least one of an alert that the part is unstable or the buckling factor.

Further aspects of the invention are provided by the subject matter of the following clauses:

A system includes a memory module configured to store a computer model of a part for manufacturing with an additive manufacturing machine, and a processor communicatively coupled to the memory module. The processor is configured to receive, from the memory module, the computer model of the part, discretize the computer model of the part into a mesh including a plurality of nodes, predict a deformation behavior the plurality of nodes of the mesh under a simulated sintering process, determine a buckling factor for the part based on the predicted deformation behavior of the mesh, determine whether the buckling factor exceeds a threshold, in response to determining that the buckling factor exceeds the threshold, export the computer model to the additive manufacturing machine for pre-build processing, and in response to determining that the buckling factor does not exceeds the threshold, output, to a display of the system, at least one of an alert that the part is unstable or the buckling factor.

The system of any preceding clause, wherein the buckling factor defines a minimum load at which the part becomes unstable.

The system of any preceding clause, wherein the load is a force due to gravity on a portion of the part situated above a lower portion of the part.

The system of any preceding clause, wherein the processor is further configured to generate for display a buckling mode shape of the part, wherein the buckling mode shape illustrates a buckling event of one or more portions of the modelled part.

The system of any preceding clause, wherein the buckling mode shape includes a heat map illustration of the part identifying relative deformation of one or more portions of the modelled part.

The system of any preceding clause, wherein the buckling mode shape is determined based on the results of the simulated sintering process applied to modelled part.

The system of any preceding clause, wherein the buckling mode shape is determined at one or more time intervals during the simulated sintering process.

The system of any preceding clause, wherein the buckling mode shape identifies one or more suggested portions of the part to add support material to reduce the predicted deformation behavior of the part.

The system of any preceding clause, wherein the processor is configured to predict the deformation behavior of the mesh under the simulated sintering process includes implementing a finite element analysis of the mesh.

The system of any preceding clause, wherein the simulated sintering process is defined by a temperature and a duration for exposing the part to the temperature.

The system of any preceding clause, wherein the part is a green part and the computer model is parameterized to digitally represent a composition and structure of the green part.

The system of any preceding clause, wherein the pre-build processing includes a process to pre-distort the computer model of the part based on the predicted deformation behavior such that a desired sintered part can be achieved after sintering.

A method includes receiving, from a memory module, a computer model of a part; discretizing, with a computing device, the computer model of the part into a mesh including a plurality of nodes; predicting a deformation behavior the plurality of nodes of the mesh under a simulated sintering process; determining a buckling factor for the part based on the predicted deformation behavior of the mesh; determining whether the buckling factor exceeds a threshold; in response to determining that the buckling factor exceeds the threshold, exporting the computer model to an additive manufacturing machine for pre-build processing; and in response to determining that the buckling factor does not exceeds the threshold, outputting on a display at least one of an alert that the part is unstable or the buckling factor.

The method of any preceding clause, wherein the buckling factor defines a minimum load at which the part becomes unstable.

The method of any preceding clause, further comprising generating for display a buckling mode shape of the part wherein the buckling mode shape illustrates a buckling event of one or more portions of the modelled part.

The method of any preceding clause, wherein the buckling mode shape identifies one or more suggested portions on the modelled part to add support material to reduce a predicted buckling event of the part.

The method of any preceding clause, further comprising predicting the deformation behavior of the mesh under the simulated sintering process includes implementing a finite element analysis of the mesh.

The method of any preceding clause, wherein the pre-build processing includes a process to pre-distort the computer model of the part based on the predicted deformation behavior such that a desired sintered part can be achieved after sintering.

A non-transitory computer-readable medium storing instructions that, when executed by a computer processor, cause the computer processor to perform a method. The method includes receiving, from a memory module, a computer model of a part; discretizing, with a computing device, the computer model of the part into a mesh including a plurality of nodes; predicting a deformation behavior the plurality of nodes of the mesh under a simulated sintering process; determining a buckling factor for the part based on the predicted deformation behavior of the mesh; determining whether the buckling factor exceeds a threshold; in response to determining that the buckling factor exceeds the threshold, exporting the computer model to an additive manufacturing machine for pre-build processing; and in response to determining that the buckling factor does not exceeds the threshold, outputting on a display at least one of an alert that the part is unstable or the buckling factor.

The non-transitory computer-readable medium of any preceding clause, further comprising instructions for generating for display a buckling mode shape of the part wherein the buckling mode shape illustrates a buckling event of one or more portions of the modelled part.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter

What is claimed is:

1. A system comprising:
   a memory module configured to store a computer model of a part for manufacturing with an additive manufacturing machine; and
   a processor communicatively coupled to the memory module and configured to:
   receive, from the memory module, the computer model of the part,
   discretize the computer model of the part into a mesh including a plurality of nodes,
   predict a deformation behavior for the plurality of nodes of the mesh under a simulated sintering process,
   determine a buckling factor for the part using an eigenvalue buckling analysis based on the predicted deformation behavior of the mesh under the simulated sintering process,
   determine whether the buckling factor exceeds a threshold,
   in response to determining that the buckling factor exceeds the threshold, export the computer model to the additive manufacturing machine for pre-build processing, and
   in response to determining that the buckling factor does not exceeds the threshold, output, to a display of the system, at least one of an alert that the part is unstable or the buckling factor.

2. The system of claim 1, wherein the buckling factor defines a minimum load at which the part becomes unstable.

3. The system of claim 2, wherein the load is a force due to gravity on a portion of the part situated above a lower portion of the part.

4. The system of claim 1, wherein the processor is further configured to generate for display a buckling mode shape of the part, wherein the buckling mode shape illustrates a buckling event of one or more portions of the modelled part.

5. The system of claim 4, wherein the buckling mode shape includes a heat map illustration of the part identifying relative deformation of one or more portions of the modelled part.

6. The system of claim 4, wherein the buckling mode shape is determined based on the results of the simulated sintering process applied to modelled part.

7. The system of claim 4, wherein the buckling mode shape is determined at one or more time intervals during the simulated sintering process.

8. The system of claim 4, wherein the buckling mode shape identifies one or more suggested portions of the part to add support material to reduce the predicted deformation behavior of the part.

9. The system of claim 1, wherein the processor is configured to predict the deformation behavior of the mesh under the simulated sintering process includes implementing a finite element analysis of the mesh.

10. The system of claim 1, wherein the simulated sintering process is defined by a temperature and a duration for exposing the part to the temperature.

11. The system of claim 1, wherein the part is a green part and the computer model is parameterized to digitally represent a composition and structure of the green part.

12. The system of claim 1, wherein the pre-build processing includes a process to pre-distort the computer model of the part based on the predicted deformation behavior such that a desired sintered part can be achieved after sintering.

13. A method comprising:
   receiving, from a memory module, a computer model of a part;
   discretizing, with a computing device, the computer model of the part into a mesh including a plurality of nodes;
   predicting a deformation behavior for the plurality of nodes of the mesh under a simulated sintering process;
   determining a buckling factor for the part using an eigenvalue buckling analysis based on the predicted deformation behavior of the mesh under the simulated sintering process;
   determining whether the buckling factor exceeds a threshold;
   in response to determining that the buckling factor exceeds the threshold, exporting the computer model to an additive manufacturing machine for pre-build processing; and
   in response to determining that the buckling factor does not exceeds the threshold, outputting on a display at least one of an alert that the part is unstable or the buckling factor.

14. The method of claim 13, wherein the buckling factor defines a minimum load at which the part becomes unstable.

15. The method of claim 13, further comprising generating for display a buckling mode shape of the part wherein the buckling mode shape illustrates a buckling event of one or more portions of the modelled part.

16. The method of claim 15, wherein the buckling mode shape identifies one or more suggested portions on the modelled part to add support material to reduce a predicted buckling event of the part.

17. The method of claim 13, further comprising predicting the deformation behavior of the mesh under the simulated sintering process includes implementing a finite element analysis of the mesh.

18. The method of claim 13, wherein the pre-build processing includes a process to pre-distort the computer model of the part based on the predicted deformation behavior such that a desired sintered part can be achieved after sintering.

19. A non-transitory computer-readable medium storing instructions that, when executed by a computer processor, cause the computer processor to perform a method comprising:

receiving, from a memory module, a computer model of a part;

discretizing, with a computing device, the computer model of the part into a mesh including a plurality of nodes;

predicting a deformation behavior for the plurality of nodes of the mesh under a simulated sintering process;

determining a buckling factor for the part using an eigenvalue buckling analysis based on the predicted deformation behavior of the mesh under the simulated sintering process;

determining whether the buckling factor exceeds a threshold;

in response to determining that the buckling factor exceeds the threshold, exporting the computer model to an additive manufacturing machine for pre-build processing; and in response to determining that the buckling factor does not exceeds the threshold, outputting on a display at least one of an alert that the part is unstable or the buckling factor.

20. The non-transitory computer-readable medium of claim 19, further comprising instructions for generating for display a buckling mode shape of the part wherein the buckling mode shape illustrates a buckling event of one or more portions of the modelled part.

* * * * *